(12) United States Patent
Furuyama et al.

(10) Patent No.: US 10,974,338 B2
(45) Date of Patent: *Apr. 13, 2021

(54) ARC WELDING CONTROL METHOD

(71) Applicant: Panasonic Intellectual Property Management Co., Ltd., Osaka (JP)

(72) Inventors: Yuya Furuyama, Hyogo (JP); Atsuhiro Kawamoto, Hyogo (JP); Junji Fujiwara, Osaka (JP); Masaru Kowa, Osaka (JP); Kaito Matsui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 215 days.

This patent is subject to a terminal disclaimer.

(21) Appl. No.: 16/086,653

(22) PCT Filed: Mar. 17, 2017

(86) PCT No.: PCT/JP2017/010901
§ 371 (c)(1),
(2) Date: Sep. 20, 2018

(87) PCT Pub. No.: WO2017/169899
PCT Pub. Date: Oct. 5, 2017

(65) Prior Publication Data
US 2019/0084068 A1    Mar. 21, 2019

(30) Foreign Application Priority Data

Mar. 29, 2016 (JP) .............................. JP2016-065321

(51) Int. Cl.
*B23K 9/073* (2006.01)
*B23K 9/09* (2006.01)
(Continued)

(52) U.S. Cl.
CPC ................ *B23K 9/073* (2013.01); *B23K 9/02* (2013.01); *B23K 9/092* (2013.01); *B23K 9/095* (2013.01);
(Continued)

(58) Field of Classification Search
CPC .. B23K 9/0671; B23K 9/0732; B23K 9/0731; B23K 9/092; B23K 9/124; B23K 9/0956
See application file for complete search history.

(56) References Cited

U.S. PATENT DOCUMENTS 5,508,493 A    4/1996  Ueyama et al.
5,667,709 A    9/1997  Ueyama et al.
(Continued)

FOREIGN PATENT DOCUMENTS

EP    2 716 395    4/2014
EP    2 862 661    4/2015
(Continued)

OTHER PUBLICATIONS

International Search Report of PCT application No. PCT/JP2017/010901 dated Apr. 25, 2017.
(Continued)

*Primary Examiner* — Geoffrey S Evans
(74) *Attorney, Agent, or Firm* — Wenderoth, Lind & Ponack, L.L.P.

(57) ABSTRACT

In thin sheet welding, when a heat input amount relative to a sheet thickness is too large, a welding defect such as a deviation from aim due to occurrence of a strain or burn through may easily occur. When a welding current is decreased to reduce the heat input amount, there is an issue in which an arc tends to become unstable. In arc welding in which short-circuit and arcing are repeated, first heat input period (Th) and second heat input period (Tc) having a heat input amount less than that of first heat input period (Th) are periodically repeated and a welding current during an arc period in second heat input period (Tc) is decreased to extinguish the arc. This reduces the heat input amount into a welding object and suppresses burn through or a strain upon welding, while making the arc stable.

10 Claims, 6 Drawing Sheets

(51) Int. Cl.
*B23K 9/095* (2006.01)
*B23K 9/173* (2006.01)
*B23K 9/10* (2006.01)
*B23K 9/02* (2006.01)
*B23K 9/12* (2006.01)
*B23K 103/04* (2006.01)

(52) U.S. Cl.
CPC .............. *B23K 9/1012* (2013.01); *B23K 9/12* (2013.01); *B23K 9/173* (2013.01); *B23K 2103/04* (2018.08)

(56) References Cited

U.S. PATENT DOCUMENTS

| | | | |
|---|---|---|---|
| 5,670,071 | A | 9/1997 | Ueyama et al. |
| 2013/0068744 | A1* | 3/2013 | Matsui ................... B23K 9/173 219/137 R |
| 2013/0082041 | A1* | 4/2013 | Kawamoto ............. B23K 9/09 219/137.71 |
| 2019/0070687 | A1* | 3/2019 | Furuyama .............. B23K 9/073 |

FOREIGN PATENT DOCUMENTS

| | | | |
|---|---|---|---|
| JP | 58-093574 | 6/1983 | |
| JP | 63-016868 | 1/1988 | |
| JP | 1-066069 | 3/1989 | |
| JP | 4-333368 | 11/1992 | |
| JP | 10109163 A * | 4/1998 | |
| JP | 10263815 A * | 10/1998 | ............. B23K 9/092 |
| JP | 2004114088 A * | 4/2004 | ............. B23K 9/092 |
| JP | 2009-183988 | 8/2009 | |
| JP | 2013-154381 | 8/2013 | |
| JP | 2015-016482 | 1/2015 | |

OTHER PUBLICATIONS

Indian Examination Report dated Mar. 18, 2020 in corresponding Indian Patent Application No. 201847036185.

* cited by examiner

ARC WELDING CONTROL METHOD

This application is a U.S. national stage application of the PCT International Application No. PCT/JP2017/010901 filed on Mar. 17, 2017, which claims the benefit of foreign priority of Japanese patent application No. 2016-065321 filed on Mar. 29, 2016, the contents all of which are incorporated herein by reference.

TECHNICAL FIELD

The present disclosure relates to an arc welding control method of performing welding output control by generating an arc between a welding wire that is a consumable electrode and a base material that is a welding subject.

BACKGROUND ART

Recently, in view of global environmental protection, in an automobile industry, thinning of a vehicle steel sheet and the like has been promoted year by year for weight reduction, in order to improve fuel economy. Furthermore, improvement of manufacturing tact of a welding process has been promoted for productivity improvement. Therefore, an increase in welding speed and improvement of welding quality have been demanded in arc welding of a thin sheet, which is performed using a robot. However, the increase in welding speed and a challenge of preventing defects such as burn through and undercut are contrary each other. Furthermore, when a gap is produced between base materials, suppression of the burn through can improve a yield of a welding object. Therefore, reduction of man hour for modification can be expected. For this purpose, demand from the market for achieving those challenges has been growing year by year. In response to those demands, various techniques have been conventionally proposed for thin sheet welding and gap welding. For example, in pulse metal active gas (MAG) arc welding, a pulse condition such as a pulse current or a base current is switched to two pulse current groups. This can adjust an arc length (for example, refer to PTL 1). With this configuration, in butt welding or lap welding, even when a gap is produced, the arc length can be shortened. This can suppress the burn through.

CITATION LIST

Patent Literature

PTL 1: Unexamined Japanese Patent Publication No. H04-333368

SUMMARY OF THE INVENTION

However, in recent years in which thinning of a sheet for weight reduction has been promoted, pulse arc welding having a large heat input amount easily generates penetration beads on a rear side of a welding subject in comparison with short-circuit arc welding. This situation is highly likely to cause the burn through, and further a strain can easily be produced in the welding subject. The strain thus produced has a more significant effect with a longer welding length. A deviation from aim of a welding wire with respect to the welding subject may occur. Further, when high-speed welding is performed, undercut is easily produced, thereby hindering improvement of productivity. When an entire welding current is reduced, reduced heat input can be achieved. However, there is an issue in which an arc becomes unstable.

To solve the above-described issues, in an arc welding control method of the present disclosure, a welding wire that is a consumable electrode is fed by alternately repeating forward feeding that feeds the welding wire toward a welding subject and reverse feeding that feeds the welding wire in a direction opposite to the forward feeding at a predetermined period and amplitude in a periodical manner. Thus, a first heat input period having a first heat input amount and a second heat input period having a second heat input amount are periodically repeated. This method has the following features. That is, each of the first heat input period and the second heat input period includes a short-circuit period and an arc period. When release of short-circuit is detected during the short-circuit period in the second heat input period, a welding current after the release of the short-circuit during the short-circuit period in the second heat input period is decreased so as to be less than a welding current during the arc period in the first heat input period, thereby extinguishing an arc.

In addition to the above, to decrease the second heat input amount from the first heat input amount, no welding current is caused to flow during the arc period in the second heat input period.

In addition to the above, to decease the second heat input amount from the first heat input amount, when the release of the short-circuit is detected during the short-circuit period in the second heat input period, no welding current is caused to flow after a lapse of a predetermined time during the arc period in the second heat input period.

In addition to the above, for the predetermined time after the release of the short-circuit is detected during the arc period in the second heat input period, the welding current is output in the following manner, and after the lapse of the predetermined time, no welding current is caused to flow. That is, the welding current is output such that, when the welding wire is mild steel, a size of a droplet of the welding wire is not less than 1.1 times and not more than 1.5 times a wire diameter of the welding wire, and when the welding wire is a stainless wire or an aluminum wire, the size of the droplet of the welding wire is equivalent to the wire diameter.

In addition to the above, the first heat input period and the second heat input period are periodically repeated such that, according to at least one of a sheet thickness and a gap amount of the welding subject, not less than one time and not more than five times of the first heat input periods that are successively performed and one time of the second heat input period are alternately repeated in a periodical manner.

In addition to the above, a bent point of the welding current during the short-circuit period in the first heat input period immediately after the second heat input period is controlled to be a value larger than a predetermined value.

In the present disclosure, by performing short-circuit welding, a reduced heat input period that is a second heat input period in which a welding current after release of short-circuit is decreased and a first heat input period having a larger heat input amount than that of the second heat input period are periodically repeated. This can achieve reduced heat input while maintaining the stable arc. This can also suppress burn through in thin sheet welding and improve a gap tolerance. As a result, prevention of undercut and reduction of a strain during high-speed welding can be achieved, whereby improvement of welding quality can be expected.

DESCRIPTION OF EMBODIMENTS

Hereinafter, exemplary embodiments according to the present disclosure will be described with reference to FIGS. 1 to 7.

First Exemplary Embodiment

Figure 2:
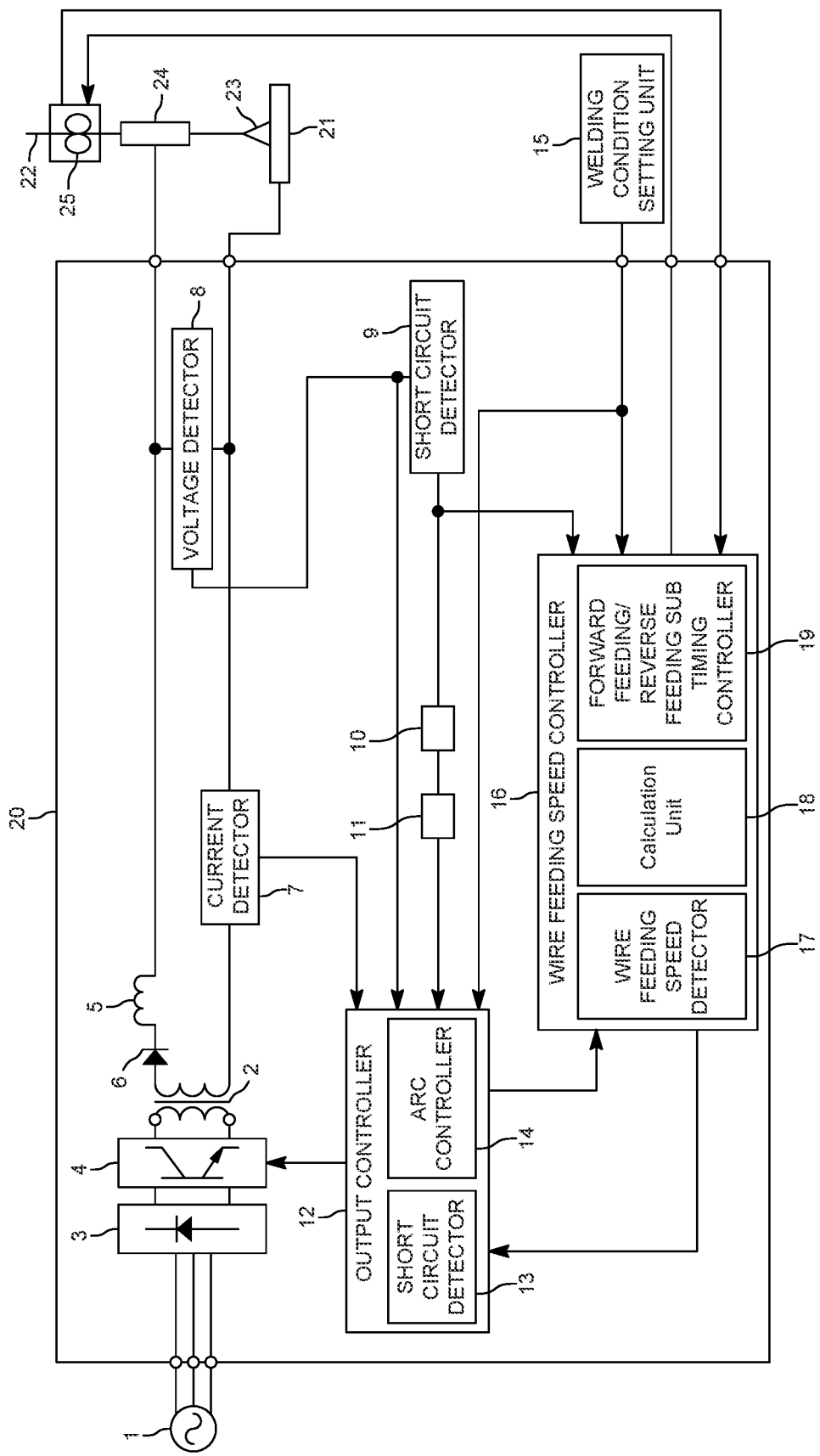
FIG. 2 is a diagram illustrating a schematic configuration of an arc welding device of the present disclosure.

First, an arc welding device that performs an arc welding control method according to the present exemplary embodiment will be described with reference to FIG. 2. FIG. 2 is a diagram illustrating a schematic configuration of the arc welding device. Arc welding device 20 performs welding by repeating arc period Ta in an arcing state and short-circuit period Ts in a short-circuited state between welding wire 22 that is a consumable electrode and welding object 21 that is a welding subject.

Arc welding device 20 includes main transformer 2, primary rectifier 3, switching unit 4, DCL (reactor) 5, secondary rectifier 6, welding current detector 7, welding voltage detector 8, short-circuit detector 9, short-circuit releasing detector 10, short-circuit/arc detector 11, output controller 12, and wire feeding speed controller 16.

Output controller 12 includes short-circuit controller 13 and arc controller 14. Wire feeding speed controller 16 includes wire feeding speed detector 17, calculation unit 18, and forward-feeding/reverse-feeding switching timing controller 19. Primary rectifier 3 rectifies an input voltage input from input power supply 1 disposed outside arc welding device 20. Switching unit 4 controls an output of primary rectifier 3 to be an output suitable for welding. Main transformer 2 converts an output of switching unit 4 into an output suitable for welding.

Secondary rectifier 6 rectifies an output of main transformer 2. DCL (reactor) 5 smooths an output of secondary rectifier 6 to be a current suitable for welding. Welding current detector 7 detects a welding current. Welding voltage detector 8 detects a welding voltage. Short-circuit/arc detector 11 determines, based on an output of welding voltage detector 8, whether a welding state is a short-circuited state in which welding wire 22 and welding object 21 are short-circuited to each other or an arcing state in which arc 23 is generated between welding wire 22 and welding object 21.

Short-circuit releasing detector 10 detects a number of times of determination that the short-circuited state is released to establish the arcing state. Output controller 12 outputs a control signal to switching unit 4 to control a welding output. In a case where short-circuit detector 9 determines that the short-circuited state is established, short-circuit controller 13 controls a short-circuit current that is a welding current during a short-circuit period. In a case in which short-circuit releasing detector 10 determines that the arcing state is established, arc controller 14 controls an arc current that is a welding current during an arc period.

When short-circuit releasing detector 10 detects the number of times of short-circuit release set by welding condition setting unit 15, arc controller 14 performs control in which a welding current in a second heat input period is decreased. Wire feeding speed controller 16 controls wire feeder 25 to control a feeding speed of welding wire 22. Wire feeding speed detector 17 detects the wire feeding speed. Calculation unit 18 calculates a predetermined time and an integrated amount of a feeding amount of welding wire 22 based on a signal from wire feeding speed detector 17. Forward-feeding/reverse-feeding switching timing controller 19 outputs a control signal that delays switching timing from forward feeding to reverse feeding and a control signal that delays switching timing from the reverse feeding to the forward feeding, of feed of welding wire 22, based on a signal from operation unit 18.

Welding condition setting unit 15 and wire feeder 25 are connected to arc welding device 20. Welding condition setting unit 15 is used to set a welding condition to arc welding device 20. Wire feeder 25 performs control of feed of welding wire 22 based on a signal from wire feeding speed controller 16.

A welding output of arc welding device 20 is supplied to welding wire 22 via welding tip 24. The welding output of arc welding device 20 then generates arc 23 between welding wire 22 and welding object 21 to perform welding.

Next, an operation of arc welding device 20 thus configured will be described with reference to FIG. 1.

Figure 1:
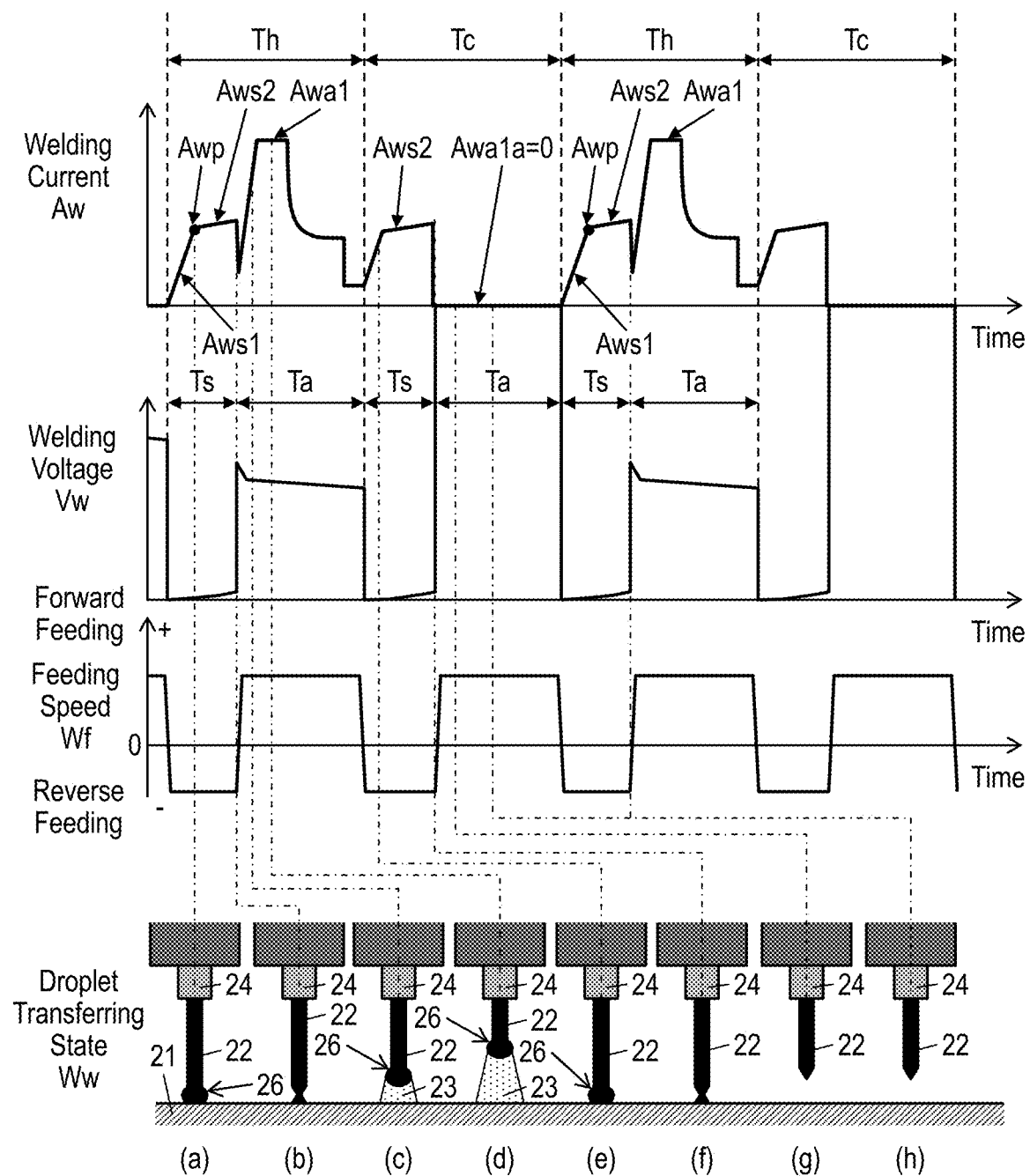
FIG. 1 is a view illustrating output waveforms and droplet transferring states of a tip of a welding wire generated by an arc welding control method according to a first exemplary embodiment of the present disclosure.

FIG. 1 is a view illustrating output waveforms generated by an arc welding control method of a consumable electrode type according to the present exemplary embodiment. FIG. 1 illustrates temporal changes of welding current Aw, welding voltage Vw, and feeding speed Wf of welding wire 22, and schematic views Ww of droplet transferring states of welding wire 22, in arc welding that alternately repeats short-circuit period Ts and arc period Ta.

In the arc welding control method according to the present exemplary embodiment, first heat input period Th and second heat input period Tc are alternately repeated. Each of first heat input period Th and second heat input period Tc includes short-circuit period Ts and arc period Ta.

During short-circuit period Ts in first heat input period Th, welding current Aw is increased from, for example, current value Awa1a=0 at first current increase rate Aws1, and reaches current value Awp at a bent point described below. Welding current Aw is then increased at current increase rate Aws2 that is smaller than current increase rate Aws1. During this short-circuit period Ts, the feeding speed of welding wire 22 is set to be negative, and the welding wire is reversely fed. During this short-circuit period Ts, welding wire 22 and welding object 21 are short-circuited and therefore welding voltage Vw becomes a value close to 0 (V).

When the short-circuit is released at switching timing from short-circuit period Ts to arc period Ta in first heat input period Th, welding current Aw is temporarily decreased, thereby increasing welding voltage Vw due to the release of the short-circuit. Feeding speed Wf of welding wire 22 is switched from a negative value to a positive value. This switches the feed of the welding wire from the reverse feeding to the forward feeding.

During arc period Ta in first heat input period Th, welding current Aw is increased to peak current value Awa1, and is kept constant for a predetermined time. The current value is then decreased.

At end timing of arc period Ta in first heat input period Th and at start timing of short-circuit period Ts in second heat input period Tc, welding current Aw is decreased to a predetermined value and welding wire 22 and welding object 21 are short-circuited. Therefore, welding voltage Vw becomes a value close to 0 (V) and feeding speed Wf of welding wire 22 is switched from a positive value to a negative value. This switches the feed of the welding wire from the forward feeding to the reverse feeding.

During short-circuit period Ts in second heat input period Tc, welding current Aw is increased from the predetermined value at a predetermined current increase rate. Welding current Aw is then increased at current increase rate Aws2. During this short-circuit period Ts, feeding speed Wf of welding wire 22 is set to be negative, and the welding wire is reversely fed.

During arc period Ta in second heat input period Tc, welding wire 22 is short-circuited. Welding current Aw at this time is set to current value Awa1a. During this arc period Ta, feeding speed Wf of welding wire 22 is set to be positive, and the welding wire is forwardly fed.

In FIG. 1, each of parts (a) to (h) shows the droplet transferring state in which welding metal is transferred from a tip of welding wire 22 that is a consumable electrode toward welding object 21, and indicates a state of welding wire 22 in droplet transferring state Ww. Time lapses from part (a) to part (h) in this order. Part (a) indicates the state of welding wire 22 during short-circuit period Ts in first heat input period Th. Part (b) indicates the state of welding wire 22 at switching timing from short-circuit period Ts to arc period Ta in first heat input period Th. Parts (c) and (d) indicate the states of welding wire 22 during arc period Ta in first heat input period Th. Part (c) indicates the state of welding wire 22 while the value of welding current Aw is being increased. Further, part (d) indicates the state of welding wire 22 when the value of welding current Aw is Awa1. Part (e) indicates the state of welding wire 22 during short-circuit period Ts in second heat input period Tc. Part (f) indicates the state of welding wire 22 at switching timing from short-circuit period Ts to arc period Ta in second heat input period Tc. Parts (g) and (h) indicate the states of welding wire 22 during arc period Ta in second heat input period Tc. Both parts (g) and (h) indicate the states of welding wire 22 after the release of the short-circuit.

Note that, with respect to transition from arc period Ta in first heat input period Th to short-circuit period Ts in second heat input period Tc, welding current Aw during arc period Ta in first heat input period Th is decreased immediately before the transition to short-circuit period Ts, thereby suppressing occurrence of a spatter due to the short-circuit. When an effect of occurrence of a spatter due to the short-circuit is negligible, the current immediately before the transition to short-circuit period Ts is not necessarily further decreased immediately before the transition.

First, in droplet transferring state Ww in part (a) of FIG. 1, after welding wire 22 and welding object 21 are short-circuited, droplet 26 of welding wire 22 is transferred into a welding pool (not illustrated) on welding object 21. At this time, welding wire 22 is fed with the reverse feeding in a direction opposite to the forward feeding that is performed toward welding object 21, thereby mechanically prompting the release of the short-circuit. Further, to release this short-circuit, welding current Aw in part (a) is controlled so as to be increased with the lapse of time.

As illustrated in FIG. 1, for example, this welding current Aw is increased in such a manner that welding current Aw during short-circuit period Ts is first increased at first current increase rate Aws1, and is then increased at second current increase rate Aws2 whose inclination is more moderate than that of first current increase rate Aws1. A current value when first current increase rate Aws1 is switched to second current increase rate Aws2 is referred to as the bent point. A value of this bent point is set to a value obtained in advance from experiments.

Next, welding voltage Vw in part (b) is increased due to the release of the short-circuit between welding wire 22 and welding object 21, whereby the release of the short-circuit is determined. In droplet transferring state Ww in part (b) at this time, a constriction phenomenon is caused near the tip of welding wire 22 by the pinch effect, thereby transferring droplet 26. The short-circuit is thus released. Welding current Aw during a period from part (c) to part (d) is controlled so as to be increased to predetermined peak current value Awa1 during arc period Ta. With respect to the feed of welding wire 22 at this time, the forward feeding that feeds welding wire 22 toward welding object 21 is performed. With this configuration, in droplet transferring states Ww during the period from part (c) to part (d), a welding speed of the tip of welding wire 22 is increased, and droplet 26 that is melted metal to be transferred to welding object 21 is formed and grown at the tip of welding wire 22. Droplet 26 thus grown is short-circuited again, which allows droplet 26 to be transferred to welding object 21. Typically, the welding is performed by repeating only first heat input period Th including short-circuit period Ts and arc period Ta through the droplet transferring states illustrated in parts (a), (b), (c), (d).

However, according to the present exemplary embodiment, in FIG. 1, the welding is performed by periodically repeating first heat input period Th through the states illustrated in parts (a), (b), (c), and (d) and second heat input period Tc through the states illustrated in parts (e), (0, (g), and (h). Second heat input period Tc has a heat input amount less than that of first heat input period Th. This configuration reduces a heat input amount to welding object 21. For example, as illustrated in FIG. 1, in first heat input period Th, after droplet 26 at the tip of welding wire 22 is grown through the states illustrated in parts (a), (b), (c), and (d), when occurrence of next short-circuit between welding wire 22 and welding object 21 is detected from welding voltage Vw in FIG. 1, droplet 26 of welding wire 22 is transferred to the welding pool in droplet transferring state Ww in part (e), similar to droplet transferring state Ww in part (a). Further, to release the short-circuit, welding current Aw in part (e) is controlled so as to be increased with the lapse of time, similar to the increase manner of welding current Aw in part (a).

Furthermore, in droplet transferring state Ww in part (0 when the release of the short-circuit is determined from welding voltage Vw in second heat input period Tc, a constriction phenomenon is caused near the tip of welding wire 22 by the pinch effect, thereby transferring droplet 26 to the welding pool, similar to droplet transferring state Ww in part (b). The short-circuit is thus released. When the release of the short-circuit is detected in second heat input period Tc, welding current Aw during a period from part (g) to part (h) is set to 0 during arc period Ta in second heat input period Tc. An arc after the release of the short-circuit during arc period Ta in second heat input period Tc is thus extinguished, as illustrated in droplet transferring states Ww during the period from part (g) to part (h). This can reduce the heat input amount in second heat input period Tc.

Note that, in the present exemplary embodiment, welding current Aw during the period from part (g) to part (h) is set to 0 during arc period Ta in second heat input period Tc. However, welding current Aw may be set lower than peak current value Awa1 during arc period Ta in first heat input period Th until occurrence of next short-circuit between welding wire 22 and welding object 21, to extinguish the arc after the release of the short-circuit. This can reduce the heat input amount in second heat input period Tc.

Note that, in second heat input period Tc, the short-circuit is released before the arc after the release of the short-circuit during arc period Ta is extinguished, and droplet 26 at the tip of welding wire 22 is transferred to the welding pool. Therefore, due to the release of the short-circuit during short-circuit period Ts in first heat input period Th after the arc is extinguished, a state of the tip of welding wire 22 can be stabilized.

However, during short-circuit period Ts in first heat input period Th immediately after second heat input period Tc that is a period immediately after the arc is extinguished, the short-circuit is caused in a state in which droplet 26 at the tip of welding wire 22 is not grown. Therefore, it is difficult to release the short-circuit. This tends to prolong short-circuit period Ts. To avoid this situation, value Awp of a short-circuit current at the bent point during short-circuit period Ts in first heat input period Th immediately after second heat input period Tc is controlled to be a larger value than the predetermined value.

When the value at bent point Awp is too large, an occurrence amount of the spatter is increased. When this value is small, the short-circuit period is prolonged. The inventors of the present invention have found through experiments that, when the value of the short-circuit current at bent point Awp during short-circuit period Ts in first heat input period Th is not less than 200 A and is not more than 450 A, the short-circuit period can be suppressed from being prolonged.

Accordingly, value Awp of the short-circuit current at the bent point during short-circuit period Ts in first heat input period Th immediately after second heat input period Tc is controlled to be not less than 200 A, which is larger than the predetermined value.

Furthermore, as in the invention according to the present disclosure, the welding is performed at feeding speed Wf that periodically feeds welding wire 22, by switching feed at the predetermined period and amplitude to the forward feeding that feeds welding wire 22 toward welding object 21 and the reverse feeding in a direction opposite to the forward feeding. Therefore, occurrence and release of the short-circuit can be promoted mechanically. First heat input period Th and second heat input period Tc having a heat input amount less than that of first heat input period Th are periodically repeated. This can achieve reduced heat input while maintaining the stable arc. This can also achieve the suppression of burn through in thin sheet welding and improvement of a gap tolerance described later.

Accordingly, even when the heat input amount varies between first heat input period Th and second heat input period Tc, disorder of the short-circuit periods can be prevented. Moreover, forward-feeding/reverse-feeding switching timing controller 19 outputs the control signal that delays switching timing from the reverse feeding to the forward feeding. This can cause the reverse feeding to be also performed after the release of the short-circuit, and therefore arc extinction can also be promoted.

Second Exemplary Embodiment

The present second exemplary embodiment relates to decrease of welding current Aw after the release of the short-circuit in second heat input period Tc.

Figure 3:
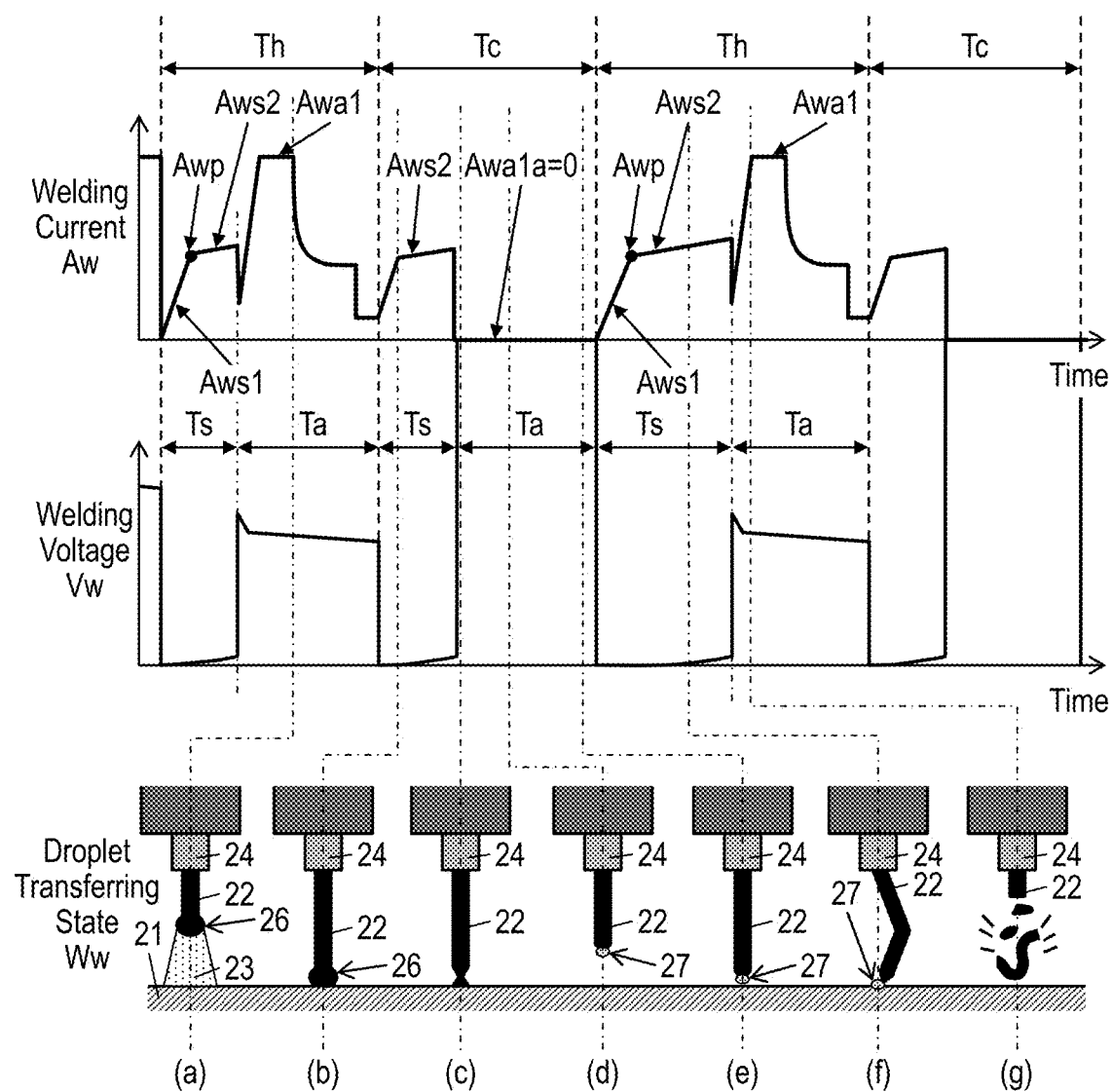
FIG. 3 is a view illustrating output waveforms and droplet transferring states of a tip of a welding wire generated by an arc welding control method according to a second exemplary embodiment of the present disclosure.

FIG. 3 is a view illustrating output waveforms generated by an arc welding control method of a consumable electrode type according to the present exemplary embodiment. FIG. 3 illustrates temporal changes of welding current Aw, welding voltage Vw, and feeding speed Wf of welding wire 22, and schematic views Ww of droplet transferring states of welding wire 22, in arc welding that alternately repeats short-circuit period Ts and arc period Ta.

In the arc welding control method according to the present exemplary embodiment, first heat input period Th and second heat input period Tc are alternately repeated. Each of first heat input period Th and second heat input period Tc includes short-circuit period Ts and arc period Ta. Further, changes of welding current Aw, welding voltage Vw, and feeding speed Wf (not illustrated) of welding wire 22 are the same as those in the first exemplary embodiment.

In FIG. 3, parts (a) to (g) indicate states of welding wire 22 in droplet transferring states Ww. Time elapses from part (a) to part (g) in this order. Part (a) indicates the state of welding wire 22 during arc period Ta in first heat input period Th. Part (b) indicates the state of welding wire 22 during short-circuit period Ts in second heat input period Tc. Part (c) indicates the state of welding wire 22 at switching timing from short-circuit period Ts to arc period Ta in second heat input period Tc. Parts (d) and (e) indicate the states of welding wire 22 during arc period Ta in second heat input period Tc. Parts (f) and (g) indicate the states of welding wire 22 in first heat input period Th that is provided after second heat input period Tc. Specifically, parts (f) and (g) indicate the states of welding wire 22 during short-circuit period Ts in first heat input period Th. Part (g) indicates the state of welding wire 22 during arc period Ta in first heat input period Th.

Note that, in the present second exemplary embodiment, components identical to components of the first exemplary embodiment are denoted by the same reference numerals or symbols, and detailed descriptions thereof are omitted. A main point different from the first exemplary embodiment is that the arc during arc period Ta after the release of the short-circuit is extinguished by controlling such that welding current Aw is set to 0 during arc period Ta in second heat input period Tc illustrated in FIG. 1, thereby causing welding current Aw not to flow at all until next short-circuit occurs. Causing the current not to flow at all enhances an effect for reducing the heat input amount in second heat input period Tc, and also achieves easy management.

Note that, when welding current Aw during arc period Ta in second heat input period Tc is set to 0 after the release of the short-circuit, welding current Aw is set to 0 in a state where welding voltage Vw is applied. Therefore, welding voltage Vw is increased. This configuration achieves smooth detection of the short-circuit between welding wire 22 and welding object 21, which is caused by welding voltage Vw, as detection of the transition to short-circuit period Ts in first heat input period Th that is a next heat input period. When welding voltage Vw is set to 0 as well as welding current Aw, the short-circuit between welding wire 22 and welding object 21 cannot electrically be detected. Therefore, the short-circuit detection is complicated.

Third Exemplary Embodiment

The present third exemplary embodiment relates to decrease of the welding current during arc period Ta in second heat input period Tc.

Figure 4:
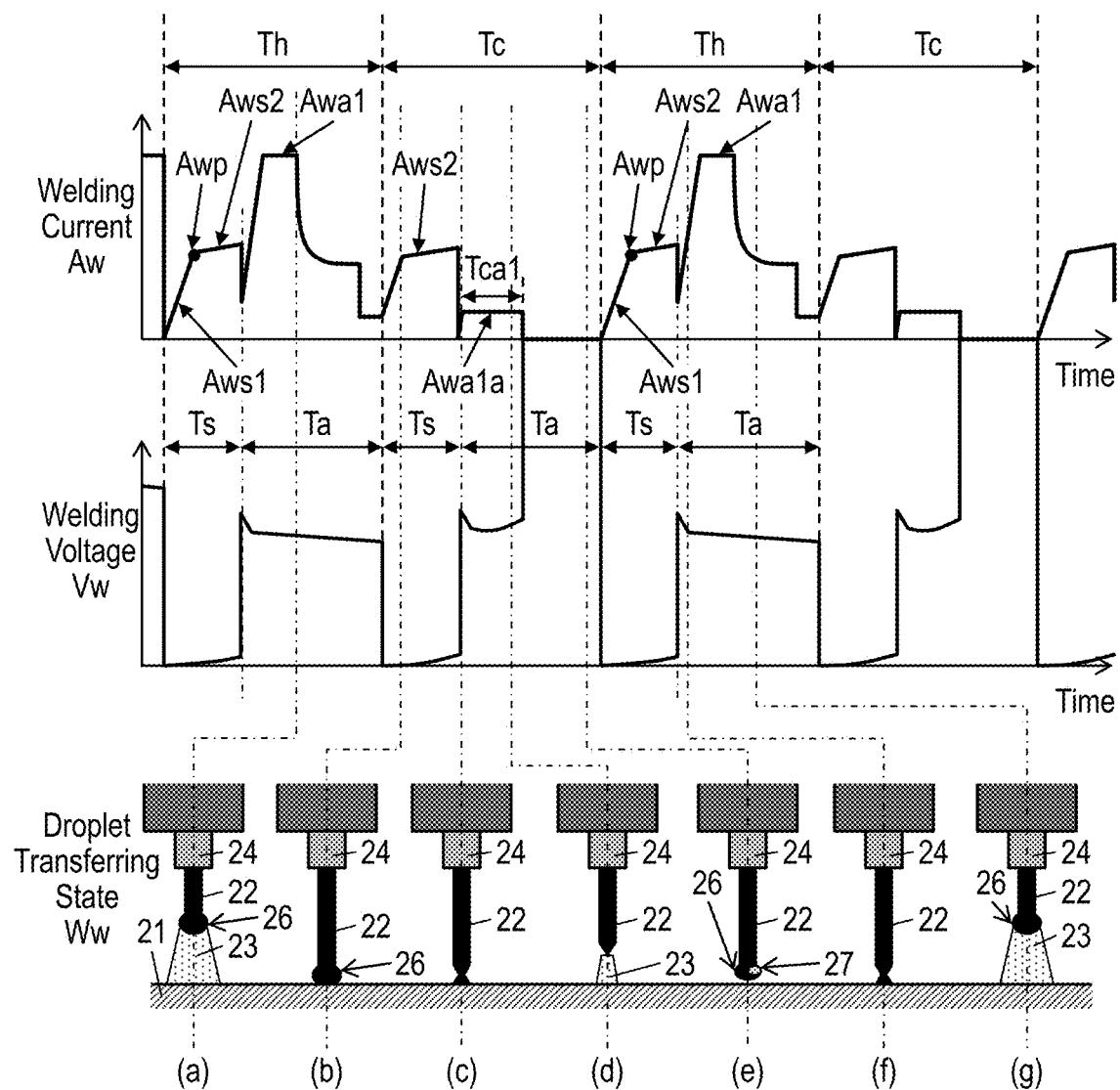
FIG. 4 is a view illustrating output waveforms and droplet transferring states of a tip of a welding wire generated by an arc welding control method according to a third exemplary embodiment of the present disclosure.

FIG. 4 is a view illustrating output waveforms generated by an arc welding control method of a consumable electrode type according to the present exemplary embodiment. FIG. 4 illustrates temporal changes of welding current Aw, welding voltage Vw, and feeding speed Wf of welding wire 22, and schematic views Ww of droplet transferring states of welding wire 22, in arc welding that alternately repeats short-circuit period Ts and arc period Ta.

In the arc welding control method according to the present exemplary embodiment, first heat input period Th and second heat input period Tc are alternately repeated. Each of first heat input period Th and second heat input period Tc includes short-circuit period Ts and arc period Ta. Note that, a change of feeding speed Wf (not illustrated) of welding wire 22 is the same as that in the first exemplary embodiment.

In FIG. 4, parts (a) to (g) indicate states of welding wire 22 in droplet transferring states Ww. Time elapses from part (a) to part (g) in this order. Part (a) indicates the state of welding wire 22 during arc period Ta in first heat input period Th. Part (b) indicates the state of welding wire 22 during short-circuit period Ts in second heat input period Tc. Part (c) indicates the state of welding wire 22 at switching timing from short-circuit period Ts to arc period Ta in second heat input period Tc. Parts (d) and (e) indicate the states of welding wire 22 during arc period Ta in second heat input period Tc. Parts (f) and (g) indicate states of welding wire 22 during arc period Ta in first heat input period Th that is provided after second heat input period Tc.

Note that, in the present third exemplary embodiment, components identical to components of the first and second exemplary embodiments are denoted by the same reference numerals or symbols, and detailed descriptions thereof are omitted. A main point different from the first and second exemplary embodiments is that the welding current during arc period Ta in second heat input period Tc is controlled so as not to partly flow like welding current Aw in FIG. 4, and the arc is partly extinguished. In other words, decreasing a second heat input amount in second heat input period Tc relative to a first heat input amount in first heat input period Th is achieved such that the release of the short-circuit is detected during short-circuit period Ts in second heat input period Tc, and no welding current Aw is caused to flow after a lapse of predetermined time Tca1 during arcing period Ta in second heat input period Tc, thereby extinguishing the arc.

Note that, the second exemplary embodiment has a higher effect for reducing the heat input amount than the present exemplary embodiment. However, after the short-circuit is released in part (c) of FIG. 3, welding current Aw is caused not to flow at all in part (d) of FIG. 3. Therefore, droplet 26 at the tip of welding wire 22 is not grown and stays in a pointed shape as indicated in droplet transferring state Ww in part (d) of FIG. 3, thereby a surface area of the tip of welding wire 22 is small. Therefore, when a material of welding wire 22 is, for example, mild steel or stainless steel, and when a time period during which the arc is extinguished during arc period Ta in second heat input period Tc is too long, for example, 5 msec or more, it is highly likely that an insulating material (hereafter, referred to as slag 27) may be attached to, for example, a portion immediately below the tip of welding wire 22. Note that, when the material of welding wire 22 is aluminum, slag 27 is unlikely to be attached.

When welding wire 22 and welding object 21 are transferred to the short-circuit during short-circuit period Ts in first heat input period Th from second heat input period Tc with the slag being attached to the portion immediately below the tip of welding wire 22, as in droplet transferring state Ww in part (e) of FIG. 3, insulation caused by the slag inhibits energization and welding wire 22 is bent, thereby extending short-circuit period Ts in first heat input period Th, as indicated in droplet transferring state Ww in part (f) of FIG. 3. This causes uneven short-circuit periods, resulting in unstable arcing.

Further, when peak current Awa1 during arc period Ta in first heat input period Th is output with welding wire 22 being bent, welding wire 22 of the bent portion is blown away, thereby generating a large number of spatters, as indicated in droplet transferring states Ww from part (f) to part (g) of FIG. 3.

Then, in the present exemplary embodiment, as illustrated in FIG. 4, when the release of the short-circuit of welding voltage Vw is detected in second heat input period Tc in part (c) of FIG. 4, welding current Aw during arc period Ta in second heat input period Tc is controlled such that current value Awa1a that is lower than current value Awa1 during arc period Ta in first heat input period Th is output during predetermined time Tca1, thereby generating the arc, as indicated in part (d) of FIG. 4. In droplet transferring state Ww at this time, droplet 26 at the tip of the welding wire is grown, thereby increasing the surface area of the tip of welding wire 22. This prevents slag 27 from being attached to the portion immediately below the tip of welding wire 22. Note that, each of predetermined time Tca1 and amplitude of current Awa1a that is controlled to be constant, for example, is different according to the material of welding wire 22, and is a value obtained from experiments.

During arc period Ta in second heat input period Tc, when the material of welding wire 22 is, for example, mild steel, a size of droplet 26 of the tip of welding wire 22 is not less than 1.1 times and not more than 1.3 times a wire diameter of welding wire 22 for MAG welding, and is not less than 1.1 times and not more than 1.5 times the wire diameter of welding wire 22 for carbon dioxide ($CO_2$) arc welding. Further, when the material of welding wire 22 is stainless steel or aluminum, conditions for growing droplet 26 of the tip of welding wire 22 to a size equivalent to the wire diameter are predetermined time Tca1 and welding current Awa1a. In other words, when the material of welding wire 22 is, for example, mild steel, the conditions for achieving the above-described size of droplet 26 are welding current Awa1a of not less than 10 A and not more than 30 A and predetermined time period Tca1 of approximately 5 msec for the MAG welding. After a lapse of predetermined time Tca1, welding current Aw during arc period Ta in second heat input period Tc is controlled to be 0 to extinguish the arc, and then droplet 26 thus grown is transferred to the welding pool (not illustrated) on welding object 21, as in droplet transferring state Ww in part (e) of FIG. 4. Accordingly, without extending the short-circuit period or generating the spatter like part (g) of FIG. 3 with welding wire 22 being bent like part (f)

of FIG. 3, the short-circuit is smoothly released like droplet transferring states Ww in parts (f) and (g) during arc period Ta in first heat input period Th in FIG. 4, and therefore a stable arc can be maintained.

Fourth Exemplary Embodiment

A fourth exemplary embodiment relates to a method of periodically repeating first heat input period Th and second heat input period Tc. Note that, in the present fourth exemplary embodiment, components identical to components of the first to third exemplary embodiments are denoted by the same reference numerals or symbols, and detailed descriptions thereof are omitted. A main point different from the first to third exemplary embodiments is that, in contrast to the first to third exemplary embodiments that repeat one time of first heat input period Th and one time of second heat input period Tc, the present exemplary embodiment repeats a plurality of times of first heat input period Th (Th1 to Th5) and one time of second heat input period Tc, according to a sheet thickness of welding object 21 such as a thin sheet.

Figure 5:
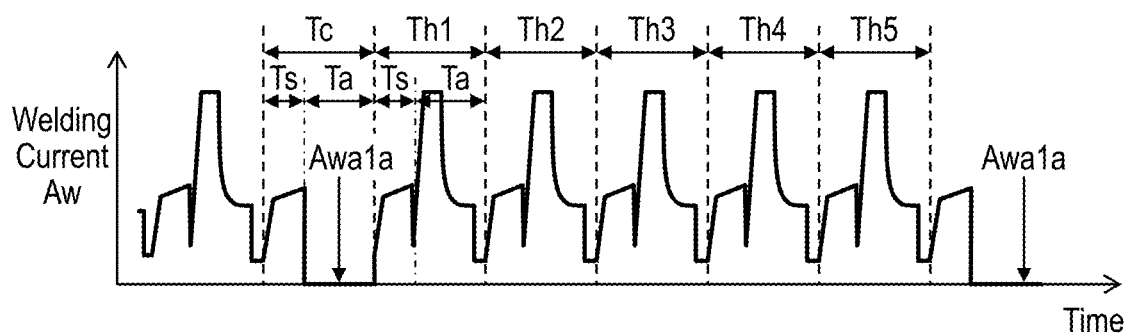
FIG. 5 is a view illustrating an output waveform generated by an arc welding control method according to a fourth exemplary embodiment of the present disclosure.
Figure 6:
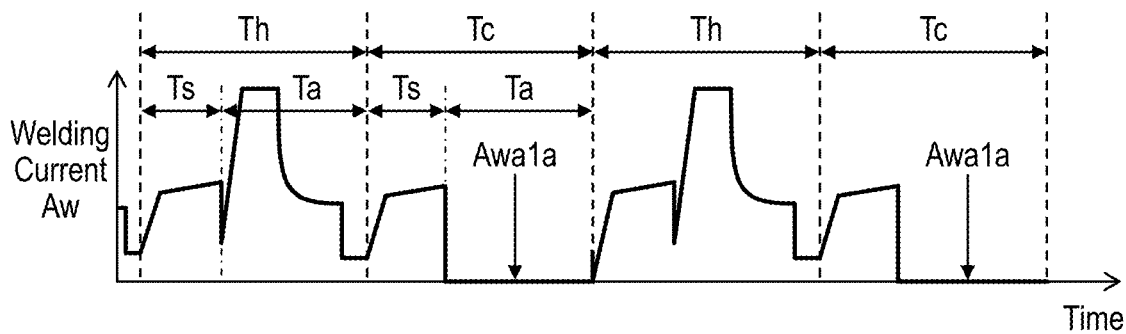
FIG. 6 is a view illustrating an output waveform generated by the arc welding control method according to the fourth exemplary embodiment of the present disclosure.

Welding current Aw in FIG. 5 periodically repeats the plurality of times of first heat input period Th (Th1 to Th5) and one time of second heat input period Tc. When it is assumed that successive repeat counts of first heat input period Th is Thn and successive repeat counts of second heat input period Tc is Tcn, in a case where Thn is set to five and Tcn is set to one, five times of first heat input period Th and one time of second heat input period Tc are alternately repeated. In FIG. 6, the successive repeat counts of first heat input period Th satisfies Thn=1, and the successive repeat counts of second heat input period Tc satisfies Tcn=1. One time of first heat input period Th and one time of second heat input period Tc are repeated. An effect for reducing a heat input amount into welding object 21 becomes higher, with reduced successive repeat counts Thn of the first heat input period. In other words, with welding object 21 having a reduced sheet thickness, successive repeat counts Thn of first heat input period Th is preferably small. Therefore, the heat input amount into welding object 21 can be reduced.

However, when successive repeat counts Thn in first heat input period Th exceeds five, the heat input amount is relatively increased. Therefore, the effect for reducing the heat input amount is decreased. Furthermore, when successive repeat counts Tcn of second heat input period Tc exceeds one, successive second heat input periods Tc is likely to cause uneven short-circuit periods Ts in subsequent first heat input period Th, thereby making the arc unstable. Accordingly, the plurality of times of first heat input period Th of not less than one time and not more than five times and one time of second heat input period Tc are alternately repeated so that the heat input amount can be reduced while maintaining the stable arc. This leads to suppression of burn through and improvement of a gap tolerance.

Figure 7:
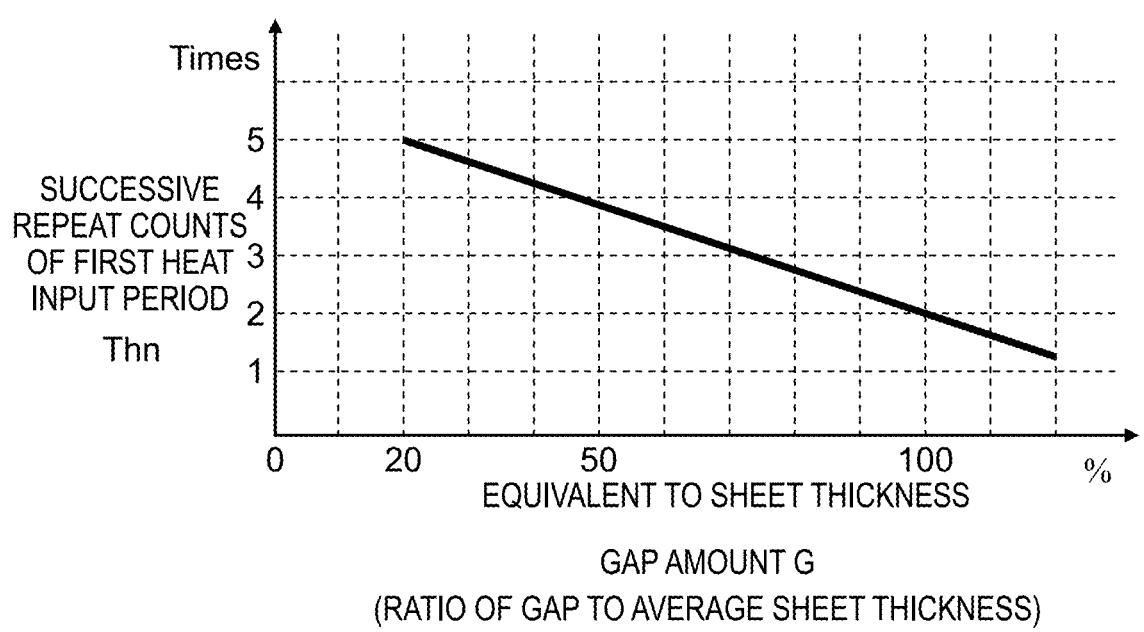
FIG. 7 is a graph illustrating a relationship between successive repeat counts Thn of a first heat input period and gap amount G according to the fourth exemplary embodiment of the present disclosure.

FIG. 7 is a graph illustrating a relationship between successive repeat counts Thn of first heat input period Th and gap amount G.

Note that, in FIG. 7, successive repeat counts Tcn of second heat input period Tc is set to 1, and a material of welding wire 22 and a material of welding object 21 are set to mild steel. For example, for lap welding, a ratio of a gap that is a clearance between sheets to be overlapped with each other to an average sheet thickness of sheets to be irradiated with the arc, of welding object 21, is defined as gap amount G [%], and a case of the gap being identical to the sheet thickness is expressed by gap amount G=100%. Successive repeat counts Thn of first heat input period Th is set to decrease with increased gap amount G. This can improve the gap tolerance. When gap amount G is 100%, successive repeat counts Thn of first heat input period Th is two, and when gap amount G is 20%, successive repeat counts Thn of first heat input period Th is five.

As describe above, in the short-circuit welding in which the short-circuit and the arcing are repeated, according to at least one of the sheet thickness and the gap amount of welding object 21, the welding is performed by periodically repeating one time or more of first heat input periods Th that are successively repeated and one time of second heat input period Tc having a heat input amount less than that of first heat input period Th. This can achieve reduced heat input while maintaining the stable arc. This can also achieve the suppression of burn through in the thin sheet welding and the improvement of the gap tolerance, thereby leading to improvement of welding quality and productivity.

As described above, a ratio between first heat input periods Th and one time of second heat input period Tc having the heat input amount less than that of first heat input period Th is set. Therefore, switching of the heat input amount for the reduced heat input can be set finely. Moreover, the reduced heat input can be achieved, and fluctuation of bead width can be suppressed, thereby being capable of acquiring excellent bead external appearance. In the short-circuit arc welding of the present invention, the heat input amount is lower than that of the pulse arc welding, and therefore shortening of an arc length and reduction of the heat input amount can be achieved.

With those configurations, the welding current during the arc period is periodically decreased to improve safety of the arcing. The heat input amount is suppressed and the arc length is shortened to prevent undercut during high-speed welding. By suppressing the heat input amount, it is possible to reduce a strain and prevent burn through, during, in particular, welding of a thin sheet with a gap present between welding objects. This can improve welding quality and productivity.

INDUSTRIAL APPLICABILITY

According to the invention of the present disclosure, in short-circuit welding in which short-circuit and arcing are repeated, by periodically repeating first heat input period Th and second heat input period Tc having a heat input amount less than that of first heat input period Th, it is possible to achieve reduced heat input while maintaining the stable arc. This can also achieve suppression of burn through in thin sheet welding and improvement of a gap tolerance, thereby leading to improvement of welding quality and productivity. These arc welding control methods are industrially useful as an arc welding control method of performing short-circuit arc welding while feeding a welding wire that is a consumable electrode.

REFERENCE MARKS IN THE DRAWINGS

1 input power supply
2 main transformer
3 primary rectifier
4 switching unit
5 DCL (reactor)
6 secondary rectifier
7 current detector
8 voltage detector
9 short-circuit detector
10 short-circuit releasing detector 11 short-circuit/arc detector
12 output controller
13 short-circuit controller
14 arc controller
15 welding condition setting unit
16 wire feeding speed controller
17 wire feeding speed detector
18 calculation unit
19 forward-feeding/reverse-feeding switching timing controller
20 arc welding device
21 welding object
22 welding wire
23 arc
24 welding tip
25 wire feeder
26 droplet
27 slag

The invention claimed is:

1. An arc welding control method comprising:
performing arc welding in which a welding wire that is a consumable electrode is fed by alternately repeating forward feeding that feeds the welding wire toward a welding subject and reverse feeding that feeds the welding wire in a direction opposite to the forward feeding at a predetermined period and amplitude in a periodical manner, and a first heat input period having a first heat input amount and a second heat input period having a second heat input amount that is less than the first heat input amount are periodically repeated,
wherein each of the first heat input period and the second heat input period includes a short-circuit period and an arc period, and when release of short-circuit of the welding wire is detected during the short-circuit period in the second heat input period, an arc is extinguished.

2. The arc welding control method according to claim 1, wherein a welding current during the arc period in the second heat input period is decreased so as to be less than a welding current during the arc period in the first heat input period so that the arc is extinguished.

3. The arc welding control method according to claim 2, wherein a bent point of the welding current during the short-circuit period in the first heat input period immediately after the second heat input period is controlled to be a value larger than a predetermined value.

4. The arc welding control method according to claim 2, wherein no welding current is caused to flow during the arc period in the second heat input period.

5. The arc welding control method according to claim 4, wherein a bent point of the welding current during the short-circuit period in the first heat input period immediately after the second heat input period is controlled to be a value larger than a predetermined value.

6. The arc welding control method according to claim 1, wherein no welding current is caused to flow after a lapse of a predetermined time during the arc period in the second heat input period.

7. The arc welding control method according to claim 6, wherein
during the arc period in the second heat input period, for the predetermined time, the welding current is output such that, when the welding wire is mild steel, a size of a droplet of the welding wire is not less than 1.1 times and not more than 1.5 times a wire diameter of the welding wire, or when the welding wire is a stainless wire or an aluminum wire, the size of the droplet of the welding wire is equivalent to the wire diameter, and
after the lapse of the predetermined time, no welding current is caused to flow.

8. The arc welding control method according to claim 6, wherein a bent point of the welding current during the short-circuit period in the first heat input period immediately after the second heat input period is controlled to be a value larger than a predetermined value.

9. The arc welding control method according to claim 1, wherein the first heat input period and the second heat input period are periodically repeated such that, according to at least one of a sheet thickness and a gap amount of the welding subject, not less than one time and not more than five times of the first heat input periods that are successively performed and one time of the second heat input period are alternately repeated periodically.

10. The arc welding control method according to claim 1, wherein a bent point of the welding current during the short-circuit period in the first heat input period immediately after the second heat input period is controlled to be a value larger than a predetermined value.

* * * * *